United States Patent [19]

Tanaka et al.

[11] Patent Number: 5,092,758

[45] Date of Patent: Mar. 3, 1992

[54] DISC MOLDING APPARATUS

[75] Inventors: Toshifumi Tanaka; Yasuo Ohira; Toshihiko Ishida, all of Nagano, Japan

[73] Assignee: TDK Corporation, Tokyo, Japan

[21] Appl. No.: 522,087

[22] Filed: May 14, 1990

Related U.S. Application Data

[63] Continuation of Ser. No. 403,856, Sep. 1, 1989, abandoned, which is a continuation of Ser. No. 288,565, Dec. 22, 1988, abandoned.

[30] Foreign Application Priority Data

Dec. 24, 1987 [JP]  Japan .................. 62-325429

[51] Int. Cl.⁵ ............................................. B29C 45/43
[52] U.S. Cl. ................................. 425/422; 425/542; 425/556; 425/810
[58] Field of Search ............... 425/810, 556, 542, 422; 264/106, 107

[56] References Cited

U.S. PATENT DOCUMENTS

| | | | |
|---|---|---|---|
| 4,185,955 | 1/1980 | Holmes et al. ............... | 425/810 X |
| 4,375,948 | 3/1983 | Von Holdt ..................... | 425/556 X |
| 4,391,579 | 7/1983 | Morrison ........................ | 425/810 X |
| 4,648,834 | 3/1987 | Von Holdt ..................... | 425/422 X |
| 4,653,997 | 3/1987 | Sheffield et al. .................. | 425/556 |
| 4,660,801 | 4/1987 | Schad ............................. | 425/556 X |
| 4,790,738 | 12/1988 | Shimojo et al. ................ | 425/810 X |

*Primary Examiner*—Richard L. Chiesa
*Attorney, Agent, or Firm*—Oblon, Spivak, McClelland, Maier & Neustadt

[57]     ABSTRACT

A disc molding apparatus capable of satisfactorily accomplishing the release of a molded disc without any trouble to eliminate deformation of the disc during the release and improve quality, reliability and productivity of the disc. In the disc molding apparatus, an air inlet port is provided in proximity to an outer stamper holder of an outer ring for supplying air toward a central region of a disc molded in a cavity of a mold body from a periphery of the disc and a communication passage communicating with the air inlet passage is provided at the outer ring, so that air may be more uniformly blown against the disc during the release of the disc from a stamper.

12 Claims, 6 Drawing Sheets

DISC MOLDING APPARATUS

This application is a continuation of application Ser. No. 403,856 filed on Sept. 1, 1989, which is a continuation of Ser. No. 288,565, filed on Dec. 22, 1988. Both cases are abandoned.

BACKGROUND OF THE INVENTION

1. Field of the invention

This invention relates to a disc molding apparatus, and more particularly an apparatus for molding a disc-like information medium such as an optical disc, a photomagnetic disc or the like.

2. Description of the Prior Art

Conventionally, a disc-like information medium such as an optical disc, a photo-magnetic disc or the like (hereinafter referred to as "disc") which functions as an information recording carrier is generally formed by injection molding using a molding apparatus for a disc. In such a conventional disc molding apparatus used for this purpose, ejection of a molded disc product for release of the disc from a stamper is conducted in such a manner as shown in FIG. 1. More particularly, it is carried out by blowing air against a molded disc 100 through an air blowout slit 102 defined between a stamper holder 104 arranged at a movable mold 106 and a sleeve 108.

In general, a shape of grooves or pits formed on a transfer surface of a disc by transfer-molding is classified into two groups. One of them is a spiral group wherein a continuous groove of uniform unevenness is spirally formed from an outer periphery of the disc to its inner periphery. The other is a group wherein pits are partially discontinuously arranged as used in a sample servo system in which only some pits different in length are formed. This is typically seen in a compact disc or the like.

Formation of a substrate for a disc by injection molding using a stamper having a format capable of providing the disc with such a transfer surface as described above causes traces like slippage of pits or grooves to occur adjacent to positions at which the pits or grooves are to be originally formed. More specifically, in the conventional disc molding apparatus, the air blowout slit 102 is positioned at a central region of the molded disc, so that it is required to carry out peeling of the disc from a stamper 110 at the central portion of the disc 100. This causes failure in the proper release of the disc from the stamper and adversely affects the transfer surface of the disc during the release, resulting in birefringence nonuniformity, deformation of grooves or pits formed on the transfer surface of the disc, deformation of the disc itself, distortion of the disc and the like to deteriorate quality, reliability and productivity of the disc.

Also, when a molded disc is formed of a polycarbonate resin material, it is required to take out the molded disc product at a temperature as high as about 120° C., resulting in further deformation of the molded disc. Further, an area ratio between projections and depressions between grooves or pits formed on a transfer surface of the disc is significantly large, so that a degree of adhesion between the resin and the stamper at the projections is highly different from that at the depressions to lead to deformation of the substrate, resulting in the molded substrate separated once from the stamper being contacted with the stamper again during the release as shown in FIG. 2. Thus, deformation of the molded disc is further promoted to deteriorate quality, accuracy and reliability of the molded disc to a degree sufficient to cause a laser to fail to follow tracks on the molded disc.

Accordingly, it would be highly desirable to develop a disc molding apparatus which is capable of forming a disc with high accuracy and without any deformation and improving productivity in the molding of the disc.

SUMMARY OF THE INVENTION

Generally speaking, in accordance with the present invention, a disc molding apparatus is provided. The disc molding apparatus includes a mold body constituted by a stationary mold and a movable mold which are arranged opposite to each other to define therein a cavity in which molding of a disc takes place. Between the stationary mold and the movable mold is interposedly arranged a stamper. The apparatus also includes an outer ring provided with an outer stamper holder and an inner ring provided with an inner stamper holder. Both stamper holders cooperate with each other for locating the stamper at a predetermined position in the mold body or cavity. Inside the inner stamper holder of the inner ring is arranged an ejecting means for carrying out the release of a disc molded in the cavity. The apparatus further includes an air inlet port arranged in proximity to the outer stamper holder of the outer ring for supplying air into the cavity and a communication passage provided at the outer ring so as to communicate with the air inlet port to guide air therethrough to the air inlet port.

In a preferred embodiment, air supply from the air inlet port is carried out toward a central region of the molded disc from an outer periphery of the molded disc between the stationary mold and a transfer side of the molded disc.

The outer ring may be constituted by a first ring element mounted on the stationary mold and also functioning to form an outer periphery of the molded disc and a second ring mounted on the movable mold and serving also as the outer stamper holder which are arranged so as to define a space therebetween. The so-defined space constitutes the above-described air inlet port.

The disc molding apparatus may also include an air feed passage arranged in the mold body so as to communicate with a central region of the cavity for supplying air therethrough to the central region of the cavity.

The air feed passage includes an annular air blowout slit communicating with the central region of the cavity. The annular air blowout slit may be defined between the inner stamper holder and the ejector means. The ejector means may comprise an ejector sleeve. The ejector sleeve may be tapered at a distal end thereof so as to cause a distal end of the air blowout slit to be outwardly enlarged and slidably arranged so as to be movable toward the cavity in its axial direction when air is supplied through the air feed passage, and the inner stamper holder may be tapered at a distal end thereof so as to cause an inner surface of the distal end to be outwardly enlarged corresponding to the ejector sleeve.

Accordingly, it is an object of the present invention to provide a disc molding apparatus which is capable of molding a disc with high accuracy and without any trouble.

It is another object of the present invention to provide a disc molding apparatus which is capable of highly improving productivity of a disc.

It is a further object of the present invention to provide a disc molding apparatus which is capable of molding a disc with high quality and reliability.

It is still another object of the present invention to provide a disc molding apparatus which is capable of satisfactorily accomplishing release of a molded disc from a stamper without any trouble such as re-contacting therebetween, deformation of the disc and the like.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings, wherein.

DETAILED DESCRIPTION OF THE PREFERRED EMBODIMENTS

Figure 1:
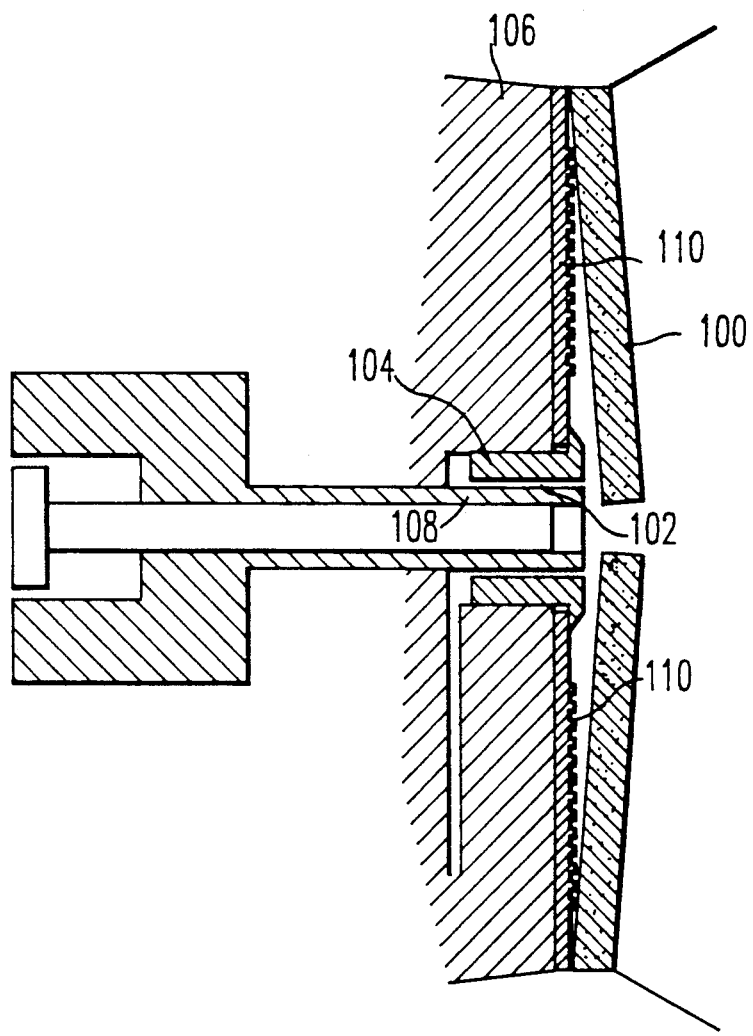
FIG. 1 is a schematic vertical sectional view showing an essential part of a conventional disc molding apparatus.

Now, a disc molding apparatus according to the present invention will be described hereinafter with reference to FIGS. 3 to 7, wherein like reference numerals designate like or corresponding parts throughout.

Figure 5:
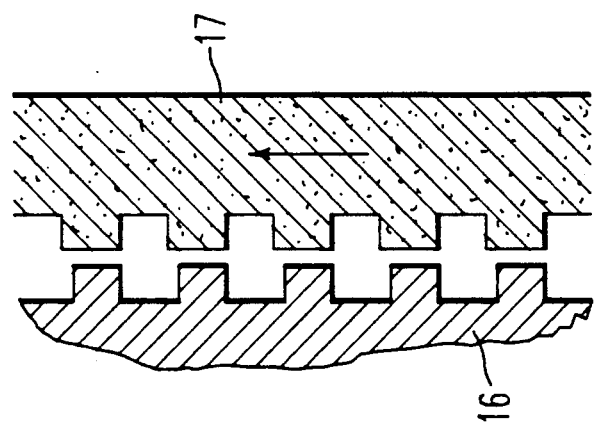
FIG. 5 is a fragmentary vertical sectional view showing release of a transfer-molded disc product from a stamper in the disc molding apparatus shown in FIG. 3.
Figure 2:
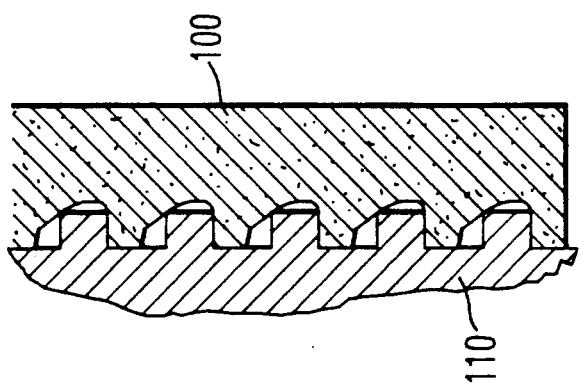
FIG. 2 is a fragmentary enlarged vertical sectional view showing a disc product molded by the apparatus shown in FIG. 1.
Figure 3:
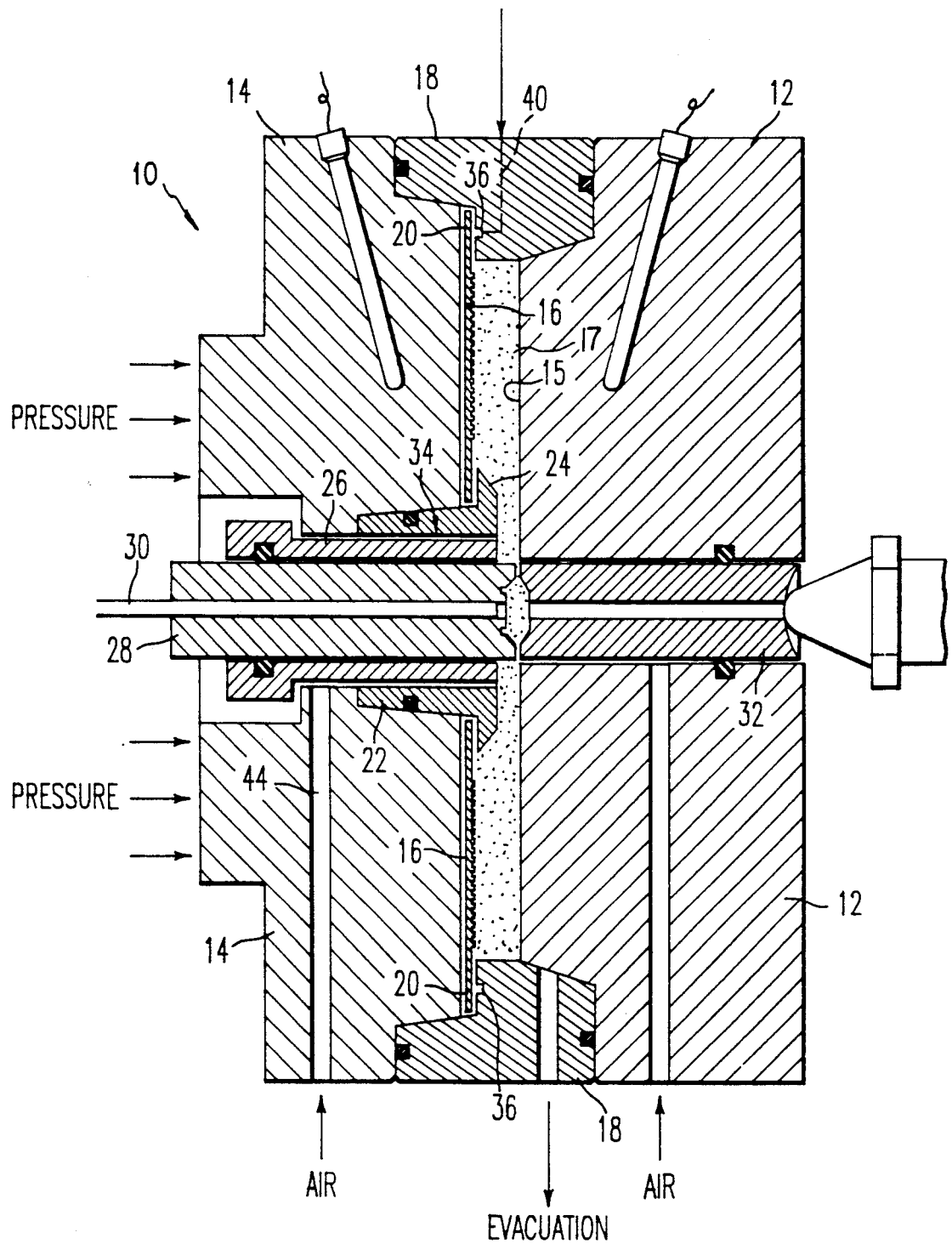
FIG. 3 is a vertical sectional view showing an embodiment of a disc molding apparatus according to the present invention.
Figure 4:
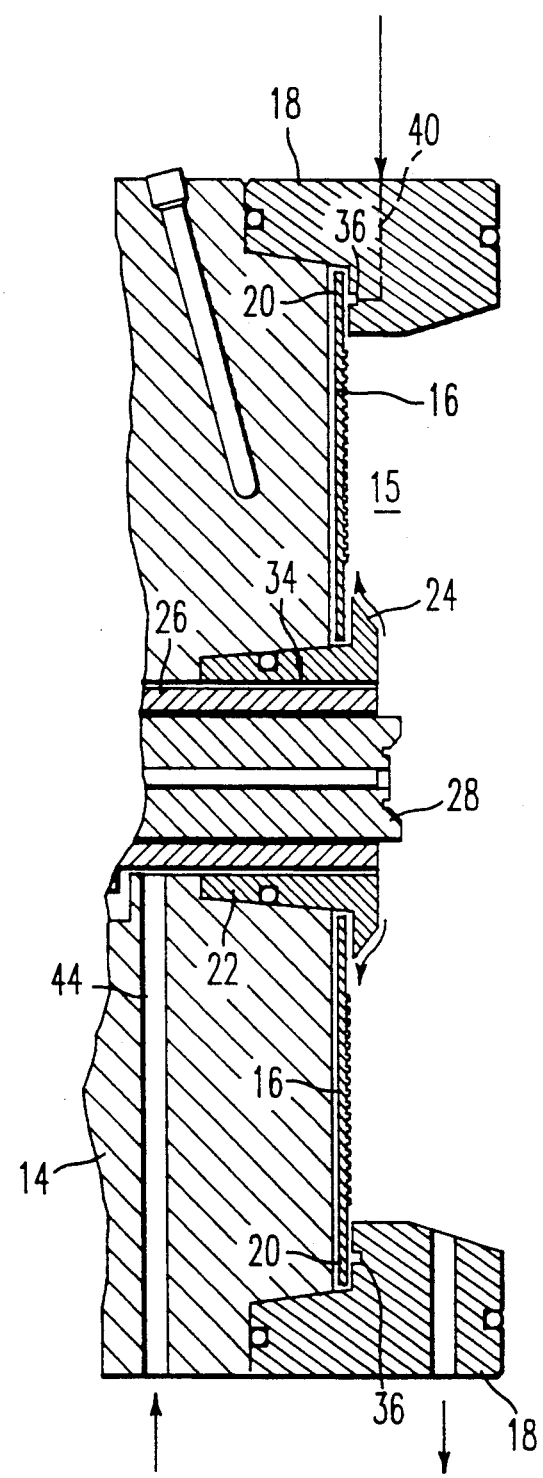
FIG. 4 is a fragmentary enlarged vertical sectional view showing outer and inner stamper holders in the disc molding apparatus shown in FIG. 3.

FIGS. 3 to 5 illustrate an embodiment of a disc molding apparatus according to the present invention. A disc molding apparatus of the illustrated embodiment generally designated by reference numeral 10 in FIG. 3 includes a mold body constituted by a stationary mold 12 and a movable mold 14. The molds 12 and 14 are arranged opposite to each other to define a cavity 15 in the mold body for molding a disc 17 therein. Between the stationary mold 12 and the movable mold 14 is interposedly arranged a stamper 16. The disc molding apparatus 10 also includes an outer ring 18 provided with an outer stamper holding member or holder 20 and an inner ring 22 provided with an inner stamper holding member or holder 24. The outer and inner stamper holders 20 and 24 are adapted to cooperate with each other for locating the stamper 16 at a predetermined position.

In the illustrated embodiment, the movable mold 14 is provided with ejecting means arranged inside of the inner ring 22 to outwardly eject the molded disc 17 for release of the disc from the stamper 16. The ejecting means may include an ejector sleeve 26 which is fittedly arranged in the inner ring 22. In the inner ring 22 are arranged a gate cut punch 28 and a runner ejecting pin 30 in order. The stationary mold 12 is provided with a sprue bushing 32. The above-described outer ring 18 is arranged substantially at the stationary mold 12, whereas the inner ring 22 is arranged substantially at the movable mold 14. Between the inner stamper holder 24 and the ejector sleeve 26 is formed an annular air blowout slit 34 for blowing out air therefrom toward the molded disc 17.

In the disc molding apparatus generally constructed as described above, an air inlet port 36 is arranged in the vicinity of the outer stamper holder 20 for feeding air into the cavity 15 which, in the illustrated embodiment, is formed by cooperation of the stationary mold 12, stamper 18 and inner ring 22. Also, a communication passage 40 is provided at the stationary mold 12 so as to communicate with the air inlet port 36 to guide air therethrough to the port 36. In the illustrated embodiment, the communication passage 40 is provided at or through the outer ring 18.

In the illustrated embodiment, the air inlet port 36 is provided directly at the outer ring 18, so that air supply may be carried out toward a center or central region of the molded disc 17 from its outer periphery between the stationary mold 12 and a transfer side of the disc 17, resulting in release of the disc 17 from the stamper 16 being accomplished while keeping grooves or pits formed on the transfer side of the disc uniform and safe as shown in FIG. 5. However, the present invention is not limited to such arrangement of the air inlet port 36 as described above.

Also, the disc molding apparatus of the illustrated embodiment may include an air feed passage 44 for supplying air therefrom through an outer periphery of the ejector sleeve 26 or the annular air blowout slit 34 toward a substantially central region of the cavity 15.

Now, the manner of operation of the disc molding apparatus of the illustrated embodiment constructed as described above will be described hereinafter with reference to FIGS. 3 to 5.

First, the movable mold 14 is moved toward the stationary mold 12, resulting in being fittedly connected to the mold 12, and then a pressure, as shown in FIG. 3, is applied to the movable mold 14 to lead to clamping between both molds 12 and 14. Then, the cavity 15 in the apparatus 10 is subjected to evacuation and then a molding material is injected into the cavity 15 by means of a nozzle (not shown) and compressed for molding while being kept at a predetermined pressure to obtain a molded disc product 17. Subsequently, the apparatus 10 is cooled and the gate cut punch 28 is moved to remove a sprue runner. Thereafter, mold opening takes place for releasing the molded disc 17 from the stamper 16.

The release is carried out by ejecting the ejector sleeve 26 to outwardly push the molded disc product 17, during which not only the air blowout slit 34 forcedly supplies gas or air therefrom toward the central region of the molded disc 17 but the air inlet port 36 forcedly supplies air from the outer periphery of the molded disc toward its central region, resulting in the release being readily and properly accomplished while substantially avoiding deformation of grooves or pits formed on a transfer surface of the molded disc 17 by transfer from the stamper 16, bending of the disc, distortion of the disc and the like, as shown in FIG. 5. Thus, the molded disc 17 exhibits high accuracy and quality while ensuring reliability in operation.

Figure 6:
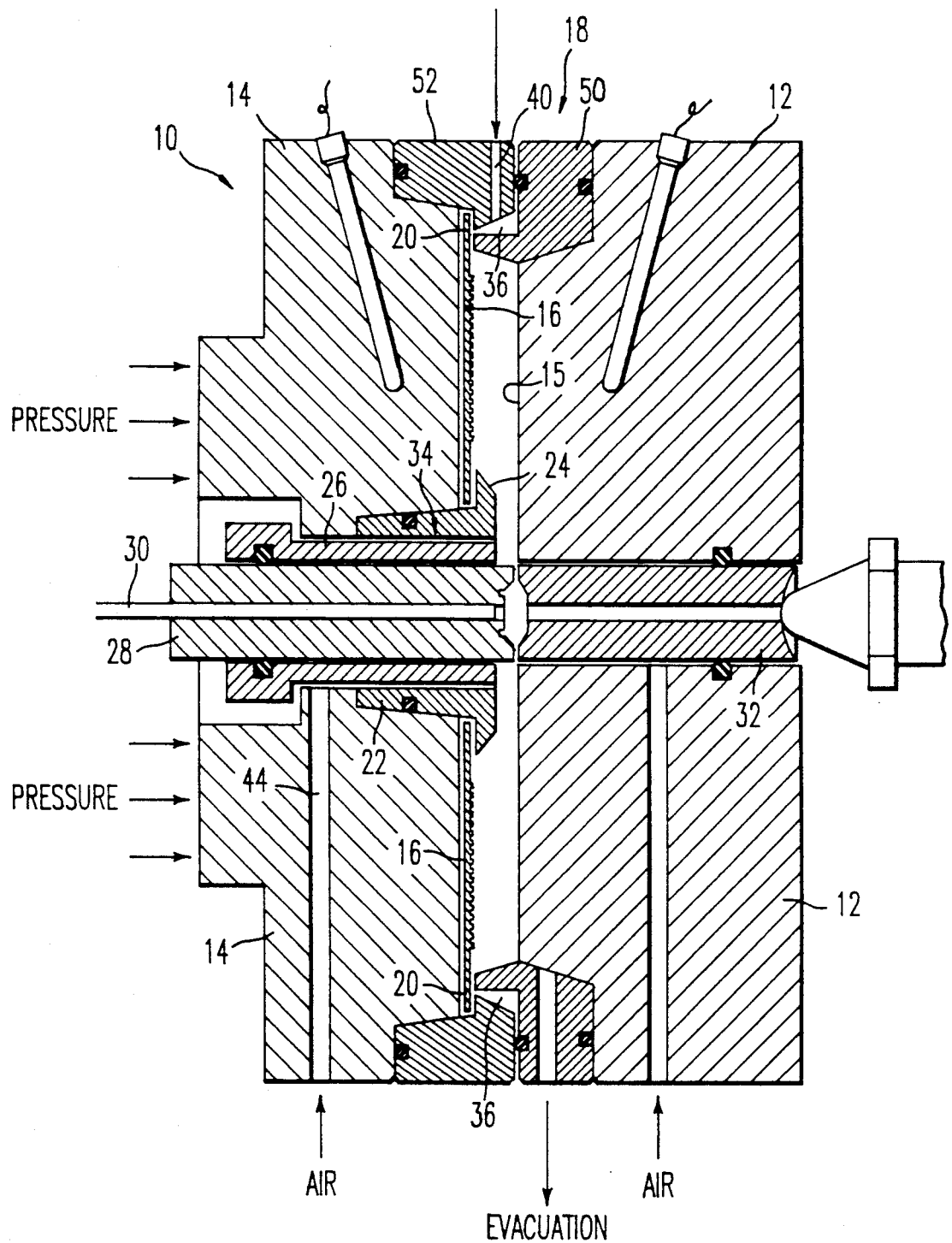
FIG. 6 is a vertical sectional view showing another embodiment of a disc molding apparatus according to the present invention.

FIG. 6 shows another embodiment of a disc molding apparatus according to the present invention. In a disc molding apparatus 10 of the embodiment, an outer ring 18 is constituted by a first ring element or auxiliary ring element 50 mounted on a stationary mold 12 and also functioning to form an outer periphery of a molded disc product 17 and a second ring element 52 mounted on a movable mold 14 and serving also as an outer stamper holder 20, which are so arranged that a space functioning as an air inlet port 36 may be defined therebetween. In the illustrated embodiment, a communication passage 40 communicating with the air inlet port 36 is provided through the second ring element 52.

The remaining part of the embodiment shown in FIG. 6 may be constructed in substantially the same manner as that shown in FIGS. 3 to 5.

Figure 7:
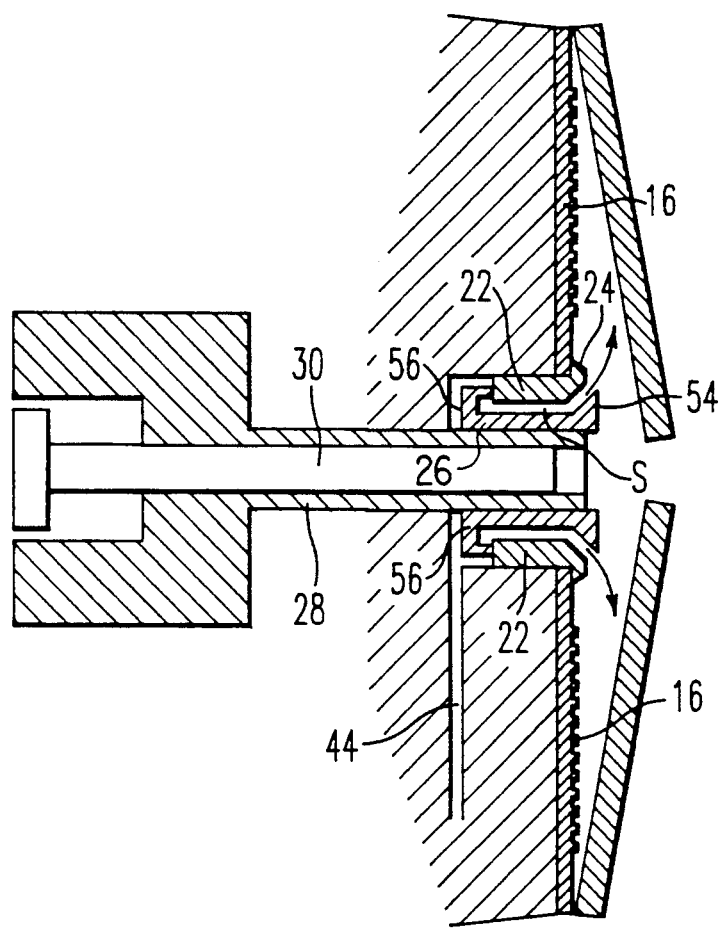
FIG. 7 is a fragmentary vertical sectional view showing a further embodiment of a disc molding apparatus according to the present invention.

FIG. 7 shows a further embodiment of a disc molding apparatus according to the present invention. In the disc molding apparatus shown in FIG. 7 is constructed in such a manner that a width of a portion of an annular air blowout slit 34 facing a molded disc product 17 is varied when release of the disc 17 from a stamper 16 is carried out.

For this purpose, an ejector sleeve 26 is formed into a hollow cylindrical shape and slidably fitted on a gate cut punch 28 so as to be moved in its axial direction. Also, the ejector sleeve 26 is tapered at its outer end or distal end 54 facing the disc 17 in a manner to be outwardly enlarged so that the air blowout slit 34 communicating with an air feed passage 44 blows out in a funnel-shaped manner along an outer periphery of the tapered end 54 toward the molded disc 17. Further, the ejector sleeve 26 is so formed and arranged that a pressure of air supplied through the passage 44 to the slit 34 is applied to a proximal end or inner end 56 of the sleeve 26 apart from the disc 17.

An inner stamper holder 24 fitted on the ejector sleeve 26 so as to define the air blowout slit 34 therebetween may be likewise tapered on an inner surface of an outer end or distal end thereof in correspondence to the tapered distal end 54 of the ejector sleeve 26, so that the distal end of the air blowout slit 34 may be uniformly outwardly enlarged.

Further, the disc molding apparatus 10 shown in FIG. 7 is preferably constructed in such a manner that when the ejector sleeve 26 is at its retreated position, an end surface of the distal end 54 of the sleeve 26 is substantially flush with an end surface of the inner stamper holder 24 or slightly outwardly projects therefrom. When air is introduced into the air feed passage 44 for release of the molded disc 17 from the stamper 16, the sleeve is outwardly slidably moved to a position shown in FIG. 7 due to application of an air pressure to the air-pressure applied end 56 of the ejector sleeve 26.

The remaining part of the disc molding apparatus shown in FIG. 7 may be constructed in substantially the same manner as that of FIGS. 3 to 5.

As can be seen from the foregoing, the disc molding apparatus of the present invention is so constructed that the air inlet port is provided in proximity to the outer stamper holder of the outer ring for supplying air to the cavity toward the central region of the disc from its periphery and the communication passage communicating with the air inlet passage is provided at the outer ring to introduce air therethrough to the air inlet passage. Such construction permits air to be more uniformly blown out against the molded disc to satisfactorily carry out release of the disc from the stamper without re-contacting therebetween while keeping the disc at its proper state. This results in avoiding disadvantages or problems such as deformation of the disc itself, deformation of grooves or pits formed on a transfer surface of disc, distortion of the disc and the like, as well as improving quality, reliability and productivity of the disc.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:
1. A disc molding apparatus comprising:
a mold body comprising a stationary mold and a movable mold arranged opposite to each other for defining a cavity therein;
a stamper interposedly arranged between said stationary mold and said movable mold;
an outer ring provided with an outer stamper holder and an inner ring provided with an inner stamper holder, said outer and inner stamper holders cooperating with each other for locating said stamper at a predetermined position;
ejecting means arranged inside of said inner stamper holder for releasing a disc molded in said cavity;
an air inlet port arranged in proximity to said outer stamper holder for supplying air into said cavity; and
a communication passage provided at said outer ring so as to communicate with said air inlet port to guide air therethrough to said air inlet port,
wherein said outer ring is constituted by a first ring element mounted on said stationary mold and also functioning to form an outer periphery of said molded disc and a second ring element mounted on said movable mold and serving also as said outer stamper holder which are arranged so as to define a spaced therebetween,
said space constituting said air inlet port.
2. A disc molding apparatus as defined in claim 1, wherein said air inlet port is provided at said outer ring; air supply from said air inlet port being carried out toward a central region of said molded disc from an outer periphery of said molded disc between the stationary mold and a transfer side of said molded disc.
3. A disc, molding apparatus as defined in claim 1, wherein said communication passage is provided at said second ring element.

4. A disc molding apparatus as defined in claim 1 further comprising an air feed passage arranged so as to communicate with a central region of said cavity for supplying air therethrough to said central region of said cavity.

5. A disc molding apparatus as defined in claim 4, wherein said air feed passage includes an annular air blowout slit communicating with said central region of said 6. A disc molding apparatus as defined in claim 5, wherein said ejecting means includes an ejector sleeve arranged inside of said inner stamper holder.

7. A disc molding apparatus as defined in claim 6, wherein said air blowout slit is formed around an outer periphery of said ejector sleeve.

8. A disc molding apparatus as defined in claim 7, wherein said ejector sleeve is tapered at a distal end thereof so as to cause a distal end of said air blowout slit to be outwardly enlarged and slidably arranged so as to be movable toward said cavity in its axial direction when air is supplied through said air feed passage.

9. A disc molding apparatus as defined in claim 8, wherein said inner stamper holder is tapered at a distal end thereof so as to cause an inner surface of said inner stamper holder to be outwardly enlarged corresponding to said ejector sleeve;

said air blowout slit being defined between said ejector sleeve and said inner stamper holder.

10. A disc molding apparatus as defined in claim 8, wherein said ejector sleeve has a proximal end formed so as to function as an air pressure applied end to which pressure of air is applied when air is supplied through said air feed passage.

11. A disc molding apparatus comprising:
a mold body comprising a stationary mold and a movable mold arranged opposite to each other for defining a cavity therein;
a stamper interposedly arranged between said stationary mold and said movable mold;
an outer ring provided with an outer stamper holder and an inner ring provided with an inner stamper holder, said outer and inner stamper holders cooperating with each other for locating said stamper at a predetermined position;
said outer ring comprising a first ring element mounted on said stationary mold and also serving to form an outer periphery of said molded disc and a second ring element mounted on said movable mold and serving also as said outer stamper holder which are arranged so as to define a space therebetween;
said space constituting said air inlet port, ejecting means arranged inside of said inner stamper holder for releasing of a disc molded in said cavity;
an air inlet port provided at said outer ring so as to cause air to be supplied toward a central region of said molded disc from an outer periphery of said molded disc between said stationary mold and a transfer side of said molded disc;
said space defined between said first ring element and said second ring element constituting a communication passage which communicates with said air inlet port to guide air therethrough to said air inlet port; and
an air feed passage provided through said ejection means so as to communicate with a central region of said cavity for supplying air therethrough to said central region of said cavity.

12. A disc molding apparatus comprising:
a mold body comprising a stationary mold and a movable mold arranged opposite to each other for defining a cavity therein;
a stamper interposedly arranged between said stationary mold and said movable mold;
an outer ring provided with an outer stamper holder and an inner ring provided with an inner stamper holder, said outer and inner stamper holders cooperating with each other for positioning said stamper;
an ejector sleeve arranged inside said inner stamper holder in a manner to define an annular air blowout slit therebetween which communicates with a central region of said cavity, said ejector sleeve functioning to eject a disc molded in said cavity;
an air inlet port provided at said outer ring so as to cause air to be supplied toward a central region of said molded disc from an outer periphery of said molded disc between said stationary mold and a transfer side of said molded disc; and
a communication passage provided at said outer ring so as to communicate with said air inlet port to guide air therethrough to said air inlet port;
an air feed passage of which a part is constituted by said annular air blowout slit and provided at said mold body for supplying air therethrough to said central region of said cavity;
said ejector sleeve and inner stamper holder each being tapered at a distal end thereof so as to cause a distal end of said air blowout slit to be outwardly enlarged;
said ejector sleeve being slidably arranged so as to be movable toward said cavity in its axial direction when air is supplied through said air feed passage.

* * * * *